US006785078B2

(12) United States Patent
Basham et al.

(10) Patent No.: US 6,785,078 B2
(45) Date of Patent: Aug. 31, 2004

(54) CONCURRENT READ AND WRITE ACCESS TO SIMULATED SEQUENTIAL DATA OF A REMOVABLE RANDOM ACCESS DATA STORAGE MEDIUM

(75) Inventors: Robert Beverley Basham, Aloha, OR (US); Paul Merrill Greco, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 10/035,117

(22) Filed: Jan. 4, 2002

(65) Prior Publication Data

US 2003/0128454 A1 Jul. 10, 2003

(51) Int. Cl.[7] .......................... G11B 15/18; G11B 17/00; G11B 19/02
(52) U.S. Cl. ........................................... 360/69; 360/71
(58) Field of Search .............................. 360/69, 71, 48, 360/96.1; 369/30.31, 34; 340/572

(56) References Cited

U.S. PATENT DOCUMENTS

| 5,485,321 | A |   | 1/1996 | Leonhardt et al. ............. 360/48 |
| 5,602,686 | A | * | 2/1997 | Shih ............................. 360/48 |
| 5,926,834 | A |   | 7/1999 | Carlson et al. ............... 711/152 |
| 5,930,481 | A |   | 7/1999 | Benhase et al. ........ 395/200.79 |
| 5,982,576 | A |   | 11/1999 | Rudi ........................... 360/96.1 |
| 6,052,341 | A |   | 4/2000 | Bingham et al. ............... 369/34 |

OTHER PUBLICATIONS

"Autonomous Disks for Advanced Database Applications", Haruo Yokota, IEEE 2000, pp. 435–442.
"Redundant Optical Storage System Using DVD–RAM Library", Takaya Tanabe, et al., IEEE 1999, pp. 80–87.
"Dynamic Scheduling Techniques for Interactive Hypermedia Servers", Babak Hamidzadeh et al., IEEE Transactions of Consumer Electronics, vol. 45, No. 1, Feb. 1999, pp. 49–56.
"The CHI, a new Fastbus Interface and Processor", H. Muller et al., IEEE Transactions on Nuclear Science,, vol. 37, No. 2, Apr. 1990, pp. 361–364.

* cited by examiner

*Primary Examiner*—David Hudspeth
*Assistant Examiner*—Jason Olson
(74) *Attorney, Agent, or Firm*—John H. Holcombe

(57) ABSTRACT

A data storage drive arranged as a plurality of logical accessors accesses data on a removable random access medium. Upon a write access for a data segment by a logical accessor, a control locks a context comprising at least one data segment of a partition to the logical accessor. The control concurrently allows read access to the data of the removable random access medium, except the locked context, and allows write access, except to the locked partition, by other logical accessors.

25 Claims, 5 Drawing Sheets

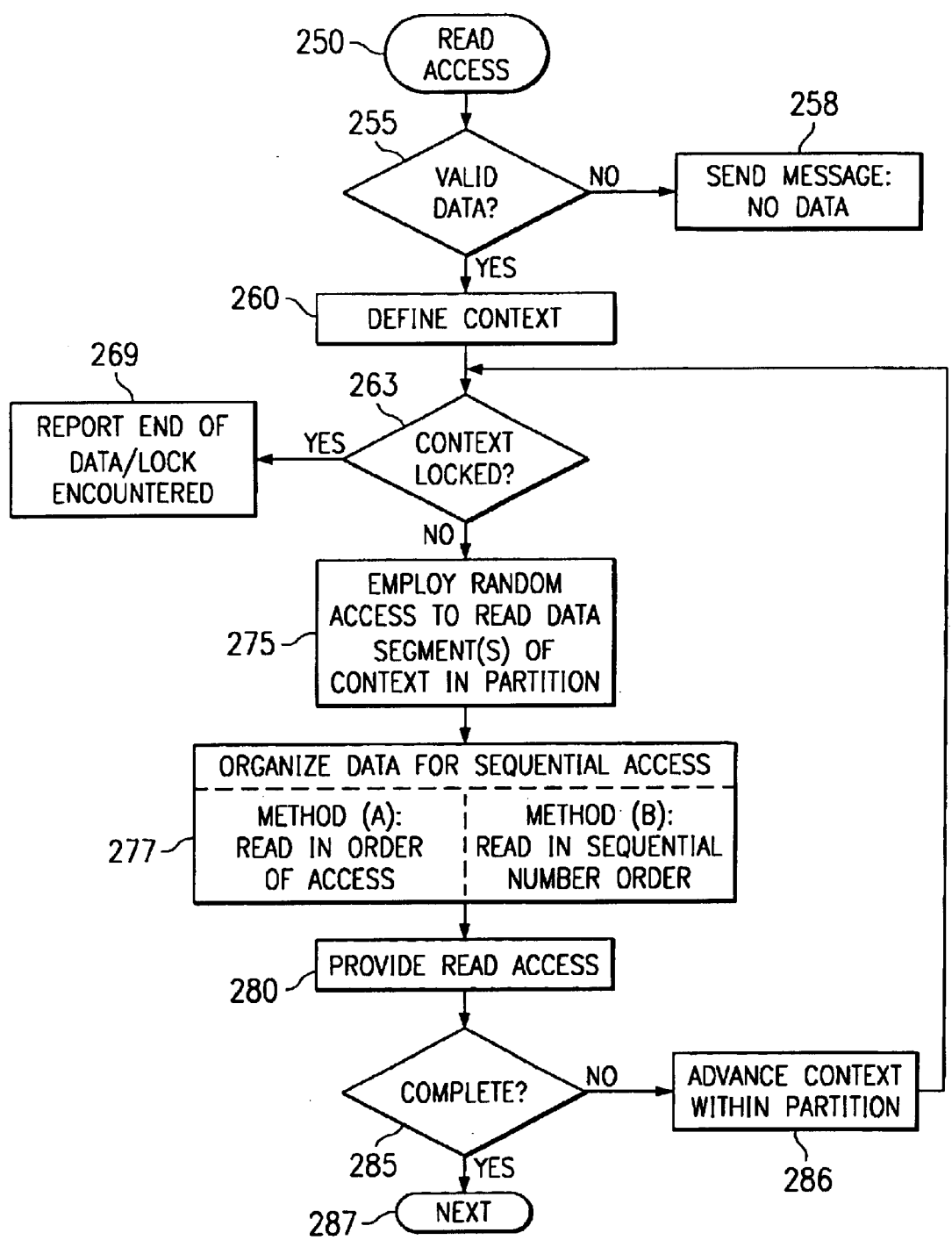

CONCURRENT READ AND WRITE ACCESS TO SIMULATED SEQUENTIAL DATA OF A REMOVABLE RANDOM ACCESS DATA STORAGE MEDIUM

DOCUMENT INCORPORATED BY REFERENCE

Commonly assigned U.S. patent application Ser. No. 09/970,881, filed Oct. 5, 2001, is incorporated for its showing of, inter alia, a storage structure and mapping for storing formatted data on random access data storage media.

FIELD OF THE INVENTION

This invention relates to data which is stored on removable data storage media, such as removable cartridges, and, more particularly, to providing access to data stored on removable random access data storage media in an environment of tape or optical disk data storage media.

BACKGROUND OF THE INVENTION

Tape data storage media, typically employing magnetic tape in a cartridge, is well known for storing large quantities of data efficiently. Typically, multiple data sets are stored together, or "stacked", in a single cartridge to take advantage of the high data storage capacity of the cartridge. Also typically, the data of each data set is, at least initially, written as a sequential string of data, and the data sets are written as sequential set of strings of data.

The data is typically written in a non-streaming manner, in that, as the host processes information and fills buffers with the data to be written, the tape is stopped and then started. It is not practical to employ another write or read process during the time between writes, since the tape would have to be wound or unwound to access another location, and the waits in the original writing process are far shorter than the access time to the other location.

Optical disk data storage media, typically employing an optical disk in a cartridge, also stores large quantities of data efficiently. While running in a drive, the disk is continually rotating, but track-to-track access is relatively slow, so that the data is written in discontinuous sectors on the same or adjacent tracks in a non-streaming manner, as discussed above, until a track is full. Thus, again, it is not practical to employ another write or read process during the time between writes, since the optical head would have to access other tracks, and the waits in the original writing process are far shorter than the access time to the other track.

In one arrangement, each data set may have a particular sequential amount of tape or optical disk storage capacity allocated to it. Thus, as data is added to the data set, it is written at an "append point" at the end of the previously written data set. Should the added data continue beyond the allocated storage capacity, and another stacked data set follow, the data is written at the next available location on the tape or optical disk. In another arrangement, the tape or optical disk storage capacity allocated to each data set is variable, and therefore is more efficiently stored. In such a case, as data is added to a data set which is followed by another stacked data set, the append point actually becomes the next available location on the tape or optical disk.

Further, as data sets are read, altered and rewritten, the desire is to rewrite the data in the same space on the tape or optical disk as the original data set. However, as above, the data to be rewritten may extend beyond the allocated storage capacity, and the data set is split and the additional data stored on the next available location on the tape or optical disk.

Typically, access to the tape or optical disk cartridge is slow. For example, a single tape or optical disk drive may require manual retrieval of a tape or optical disk cartridge from storage. Automated data storage libraries are able to store large numbers of cartridges in storage shelves and have a robot for retrieving the cartridges from the storage shelves and loading a cartridge in a data storage drive and thereby speeding the retrieval of the cartridges.

Once the cartridge is retrieved and loaded into a data storage drive, read or write access to specific data sets is sequential and relatively slow. A tape is typically rewound to a predetermined point when it is stored, called "beginning of tape", or "BOT". To access a desired data set, the tape is then wound to the location of the desired data set, the data is read until the next data set is encountered, and the tape is then wound to the location of the append point for the data set. The data transfer is interrupted while the tape is being wound, since no data can be read from the desired data set while the tape is being wound to the append point. Similarly, optical disk systems require that the laser be initialized to the media at a specific section of the disk before any access is conducted. Further, the random access from track-to-track is relatively slow, so that any data transfer is interrupted during the track-to-track access to an append point. Thus, many tape and optical disk systems provide extensive data buffering systems to present the data so as to appear as though it had been in a single, continuous sequence. The same issue occurs during write access, and the data is typically buffered and then written over the previously read data at the various non-sequential locations.

In the incorporated U.S. patent application Ser. No. 09/970,881, as a means of speeding access to data, the data is stored by removable random access data storage media, such as "hard" magnetic disks in cartridges, and corresponding data storage drives which can read and write the random access media, provided, for example, in automated data storage libraries, as a portion of the removable data storage media. As described therein, a "partition" is a related group of data that may be contiguous or discontiguous, and sequential or non-sequential on a random access medium.

Random access data storage media are more typically employed for smaller lengths of data, such as sectors, and provide direct access to the data, for example, by rapidly moving a read/write head to the track containing the desired data.

However, tape and optical disk systems are designed to read and write the data sequentially rather than randomly.

Further, only one host can be serviced at a time with a given tape or optical disk. It is not workable to go back and forth between different locations on tape or optical disk and try to thereby service more than one request. Therefore, concurrent requests for data sets on the same tape or optical disk are queued and served serially.

SUMMARY OF THE INVENTION

It is an object of the present invention to provide concurrent access by at least one host to data sets on the same removable data storage medium, employing a random access data storage medium.

A method, a data storage drive, and an automated data storage library are provided in accordance with the present invention, for accessing data on a removable random access data storage medium, such as a cartridge containing a magnetic disk.

The data stored on the removable random access data storage medium comprises a plurality of data segments, at least some of the data segments comprising at least one common data stream, called a partition, simulating tape or optical disk sequential data. The removable random access data storage medium is accessible at and removable from the data storage drive. The data storage drive is arranged as a plurality of logical accessors, and each logical accessor is arranged to communicate with at least one host for read and/or write access to the removable random access data storage medium.

A control responds to a read and/or write access of one of the logical accessors to one of the partition. Upon occurrence of a write access for a partition by one of the logical accessors, the control establishes, as a write accessed context, at least the data segment of the identified partition for the write access, and locks the write accessed context to a write access logical accessor. The control then operates a read/write access unit to access the write accessed context for the locked write access logical accessor.

As the writing is conducted in a discontinuous manner, the control allows concurrent read access to the data of the removable random access data storage medium by other logical accessors than a locked write access logical accessor, preventing read access to the write accessed context by any logical accessor other than the locked write access logical accessor; and preventing write access to any data of the locked partition by other than the logical accessor having locked write access to the partition; and upon completion of the write access by the locked write access logical accessor, releases the locking of the write accessed context to the locked write access logical accessor.

Once writing is conducted at any point in a data set, the remainder of the data subsequent to the point at which the writing occurs is no longer valid as per conventional sequential device behavior. Therefore, in one embodiment of the present invention, a write accessed context may comprise the data segments comprising the total amount of data from the present write to the end of the data set.

In another aspect of the present invention, the read random accessed data segments are organized for sequential access by the host.

Thus, the present invention takes advantage of the wait periods during the discontinuous read and write processes to utilize the high speed random access of the random access medium to provide concurrent access to different data sets. The present invention also allows time sharing of such access in an arbitrary manner, such as round robin, or in a performance weighted manner.

For a fuller understanding of the present invention, reference should be made to the following detailed description taken in conjunction with the accompanying drawings.

BRIEF DESCRIPTION OF THE DRAWINGS

FIGS. 7, 8 and 9 are flow chart depicting embodiments of the method of the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1A:
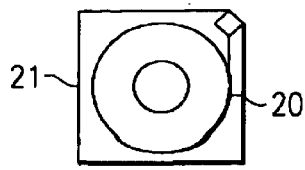
FIGS. 1A and 1B are diagrammatic representations of a prior art tape cartridge and a magnetic tape of the tape cartridge.
Figure 1B:
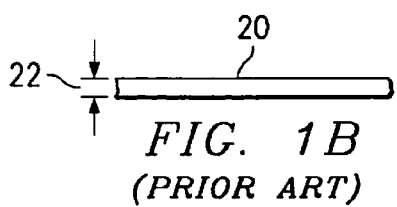

Referring to FIGS. 1A and 1B, tape data storage media, typically employing magnetic tape 20 in a cartridge 21, is well known for storing large quantities of data efficiently. As discussed above, optical disk data storage similarly stores large quantities of data. Typically, multiple data sets are stored together, or "stacked", in a single cartridge to take advantage of the high data storage capacity of the cartridge. As discussed above, access to the tape or optical disk cartridge is slow, and, once the tape cartridge 21 is retrieved and loaded into a data storage drive, read or write access to specific data sets on the tape 20 is sequential and relatively slow. A tape 20 comprises lengthwise linear tracks 22, and is typically rewound to a predetermined point when it is stored, called "beginning of tape", or "BOT". To access a desired data set, the tape is then wound to the location of the desired data set, the data is read until the next data set is encountered, and the tape is then wound to the location of the append point for the data set. The data transfer is interrupted while the tape 20 is being wound, since no data can be read from the desired data set while the tape is being wound. Optical disk systems also provide relatively slow random access between tracks. Thus, many tape and optical disk systems provide extensive data buffering systems to provide the data as though it were in a single, continuous sequence. The same issue occurs during write access, where the data is typically buffered and written as a new sequence or is written over the previously read data. However, the data set is rarely the same length or shorter than the data it replaces. Hence, writing is stopped when another previously recorded data set is encountered, a location for the addition of new recording is determined, which becomes an append point, and tape is then wound to the location of the append point for the data set and the writing continues. Further, the writing is conducted in a discontinuous manner, and the tape must be stopped between writes, and the optical disk continues to spin between writes.

Figure 2A:
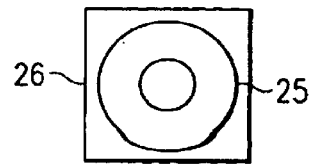
FIGS. 2A and 2B are diagrammatic representations of a prior art disk cartridge and a hard magnetic disk of the disk cartridge.
Figure 2B:
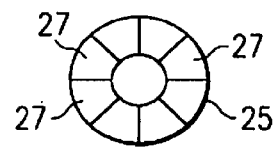

Referring to FIGS. 2A and 2B, as a means of speeding access to data stored by removable data storage media, random access media, such as "hard" magnetic disks 25 in cartridges 26, are provided, as discussed in the incorporated U.S. patent application Ser. No. 09/970,881, for example, in automated data storage libraries, as a portion of the removable data storage media. Random access data storage media are more typically employed for smaller lengths of data, such as in concentric circular tracks divided into sectors 27, and provide direct access to the data, for example, by rapidly moving a read/write head to the track and sector containing the desired data.

As discussed above, many tape and optical disk systems are designed to read and write the data sequentially rather than randomly. Hence, even though a random access medium might be employed to store tape or optical disk data, it remains likely that the data would be accessed in the same manner as tape or optical disk, and making the read and write access appear the same for both tape or optical disk and random access storage.

Further, only one host can be serviced at a time with a given tape or optical disk. It is not workable to go back and forth between different locations on tape or optical disk and try to thereby service more than one request. Therefore, concurrent requests for data sets on the same tape or optical disk are queued and served serially.

Figure 3:
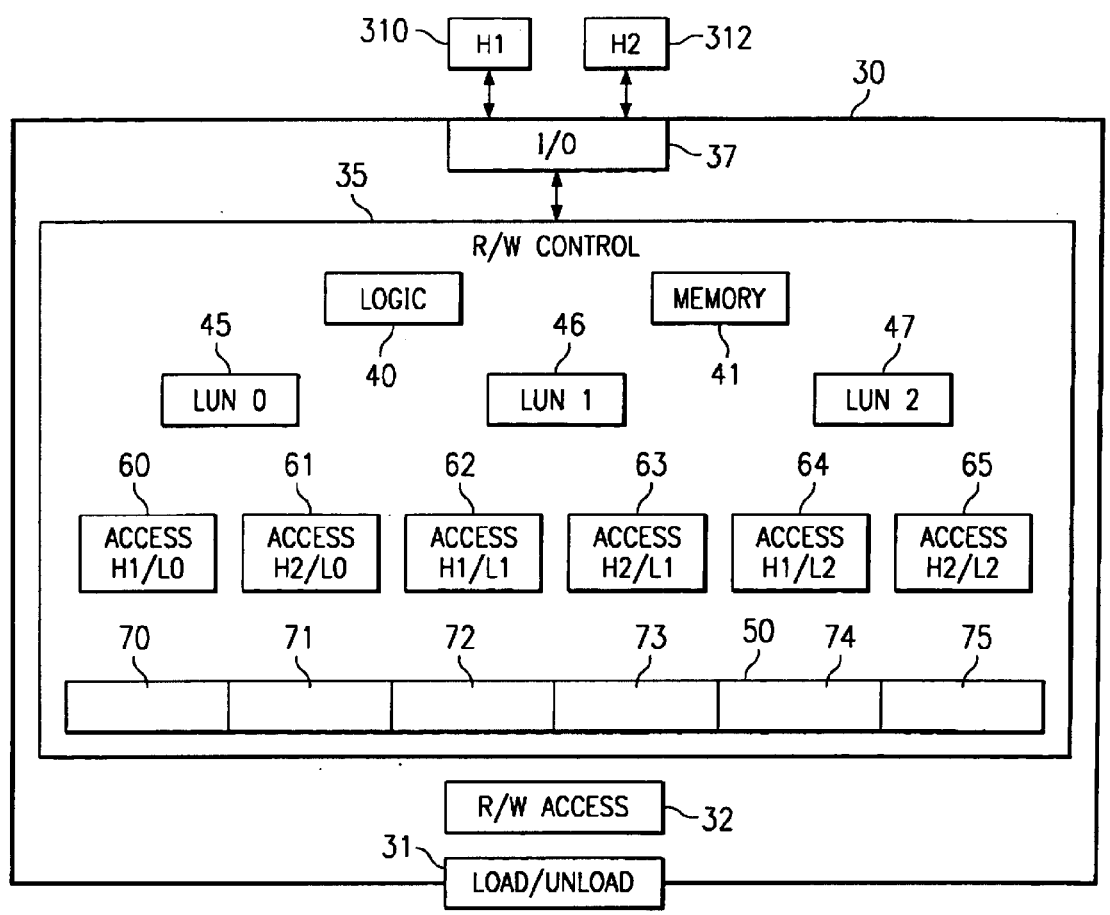
FIG. 3 is a block diagram representation of a disk drive arranged in accordance with the present invention.

FIG. 3 illustrates a data storage drive 30 which can read and write data on a random access data storage medium 25 of FIG. 2A. In the incorporated U.S. patent application Ser. No. 09/970,881, a data storage drive is also termed a "transfer station" since an entire drive is contained in a cartridge, and the transfer station only provides a data transfer interface with the cartridge containing the drive. Hence, herein, the term "data storage drive", "drive", "random access data storage medium", "portable cartridge", "removable random access data storage medium", "random access medium", etc., all refer to arrangements of a random access data storage medium together with the data storage drive to read and/or write data with respect to the random access data storage medium. In FIG. 3, the drive 30 comprises a load/unload arrangement 31 for loading a random access data storage medium cartridge 26 of FIG. 2A and opening the cartridge for access by a read/write access unit 32. As an example, the cartridge may be delivered manually, or, as another example, the cartridge may be delivered by an automated data storage library. The read/write access unit 32 may comprise a conventional servo system for rapidly moving a read/write head to the desired track, and circuitry for reading and for writing the data, under the control of read/write control 35. An input/output unit 37, such as a SCSI interface, is coupled to the read/write control 35 for receiving commands and providing the commands to the read/write control, and for receiving and transmitting data, for example, with respect to one or more hosts 310, 312.

The read/write control 35 comprises logic 40 and memory 41 for receiving commands and for operating the read/write access unit 32 and accessing specific data segments from the random access data storage medium 25 of FIGS. 2A and 2B for reading and/or writing. In accordance with the present invention, the read/write control 35 is organized, by internal arrangement or by external or internal command, into a plurality of separate logical units 45–47, or in SCSI terminology, "LUNs", each of which may be separately addressed by hosts. Virtual addresses may be provided for each logical unit with respect to each host, as is understood by those of skill in the art. Each host and each of its addressed logical units comprises a virtual address path, or a "nexus" in SCSI terminology. Herein, the nexus or the virtual address path for each host and each of the logical units coupled to the host is defined as an "accessor" 60–65, or as a "logical accessor". If virtual address paths are not employed, a logical unit, such as a LUN or similar logical structure is also defined herein as an "accessor" or "logical accessor". Thus, in the instant example, the virtual address path of host H1 310 and logical unit 0 45 comprises accessor 60, the virtual address path of host H2 312 and logical unit 0 45 comprises accessor 61, etc. Data read from the data storage medium by the read/write access unit 32, or to be written on the data storage medium, may be temporarily stored and organized in a buffer 50. The buffer 50 may comprise, for example, separate fixed length buffers, or may be arranged as separately accessible variable length buffers.

In accordance with one embodiment of the present invention, each accessor 60–65 is associated with one of the buffers 70–75 of buffer 50, and any one of the accessors may be assigned read and/or write access to the removable random access data storage media, as will be discussed hereinafter.

Figures 4, 6:
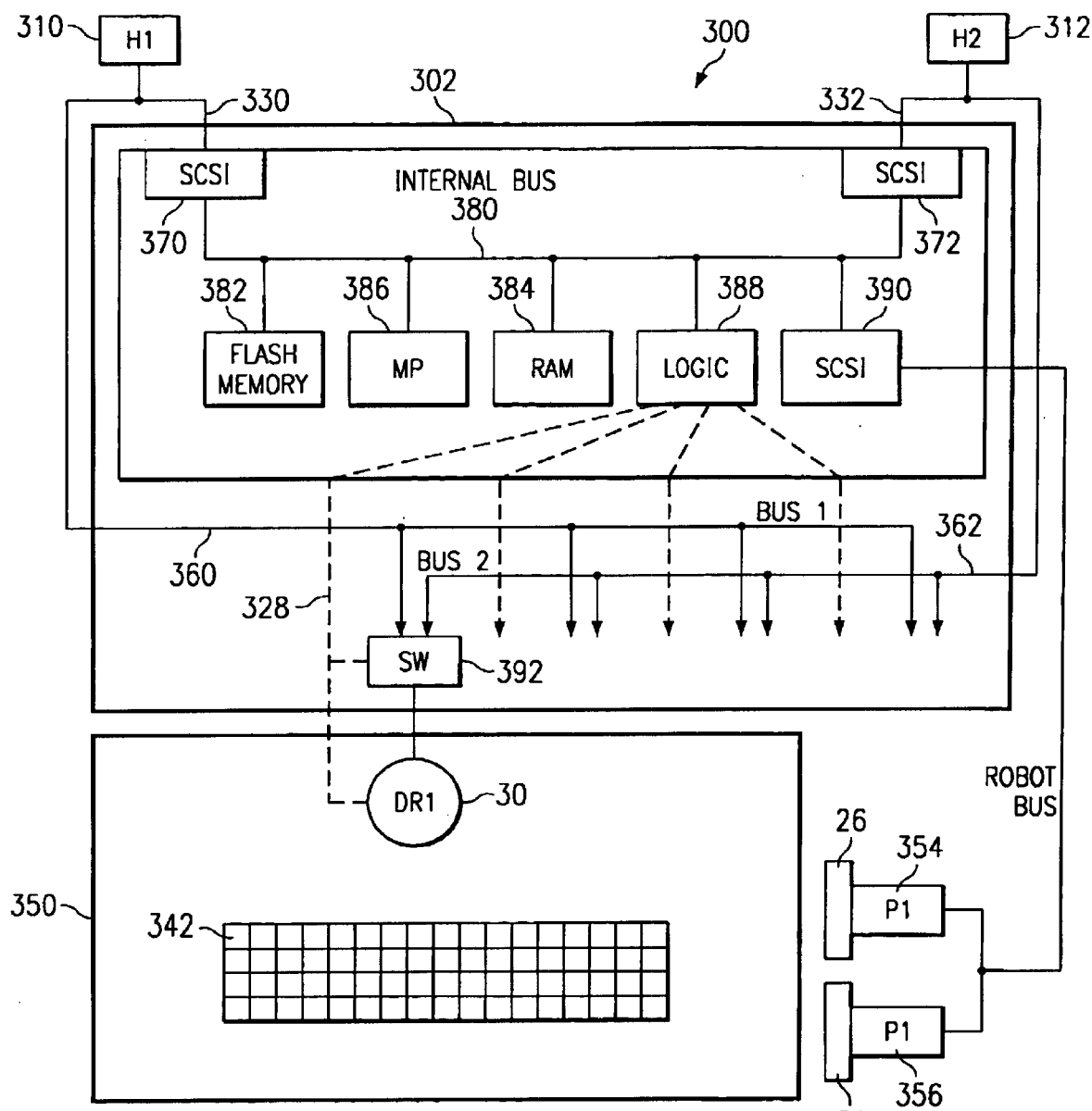
FIG. 4 is a block diagram representation of an automated data storage library arranged in accordance with the present invention.
FIG. 6 is an illustration of an index which may alternatively be employed in accordance with the present invention.

The data storage drive 30 comprises a drive in a tape library system, such as multi-host library system 300 of FIG. 4. An example of a tape library system is the IBM 3494 Data Storage Library. The tape library system may comprise a library control 302 which provides connections for at least the two hosts 310, 312 and multiple storage drives, including tape drives, not shown, and, in accordance with an embodiment of the present invention, the removable random access data storage drive 30, which may represent one of a plurality of drives each mounted in a portable cartridge for storage and transportation within the library, is also mounted in the tape library system 300 and connected by library control 302.

Host connections 330, 332 to the library control may, for example, be Fibre Channel, SCSI, or Serial Storage Architecture (SSA), as may the device connections. The data storage media, both tape and random access data storage media of FIGS. 1A and 2A, are stored in storage shelves 342 mounted in library racks 350. Robots 354, 356 have access to some or to all of the storage shelves 342, and to some or all of the tape drives and drive 30. The library control 302 switches busses 360, 362 between hosts 310, 312 and the tape drives and drive 30. The robots 354, 356 store and retrieve the tape media 21 and store and retrieve the removable random access data storage media cartridges 26 at the storage shelves 342, and load and remove the removable random access data storage media cartridges to and from the data storage drive 30, and load and remove the tape media to and from the tape drives. The robots may be adapted to transport both tape media and random access data storage media, or may be specialized to handle only one type of media.

During read and/or write operations, hosts 310, 312 are connected to the tape drives and drive 30, and the library control 302 will conduct movement commands from several hosts. In accordance with the present invention, drive 30 is provided with several virtual addresses as discussed above, at least one for each accessor 60–65 of FIG. 3. The library control 302 may change the virtual addresses of the accessors 60–65 or of the drives, using the direct signal lines 328. As is known in the art, each physical data storage medium volume, or cartridge 26, 21 of FIGS. 1A and 2A may contain multiple logical volumes of data, and inventory tables or maps of the logical volumes may reside on the medium, in the library control 302, and/or in the associated host 310, 312. These inventory maps are different from the physical storage map of the physical data storage media volumes 26, 21, which is dynamically updated in the library control to include media loaded into the data storage drives.

The host connections 330, 332 are made via host protocol circuits 370, 372 to link with the internal bus 380 of the library control 302. The internal bus provides connections to memory 382, a processor 386, logic 388 and a robot bus 390. The internal logic 388 controls switches 392 that dynamically connect multiple hosts 310, 312 through multiple busses 360, 362 to specific tape drives and drive 30.

In an aspect of the present invention, a control identifies at least data segments of a common data stream as comprising a partition. Upon occurrence of a write access for at least one data segment of an identified partition by a write access logical accessor, the control locks a portion of the partition, called a "context", to the write access logical accessor. The control then accesses the write accessed context of the locked partition at the removable random access data storage medium for the write access logical accessor. The control concurrently allows read access to the data of the non-locked portion of the same or other partitions by other logical accessors than the write access logical accessor which locked that partition, and upon completion of the write access by the write access logical accessor, releases the locking of the context of the partition and the write access logical accessor. Other write access logical accessors may concurrently lock other unique partitions of the removable random access data storage medium.

Partitions may be identified and tracked in accordance with a format construct managed in the medium itself, or, alternatively, identified and tracked in accordance with an index structure.

Figure 5:
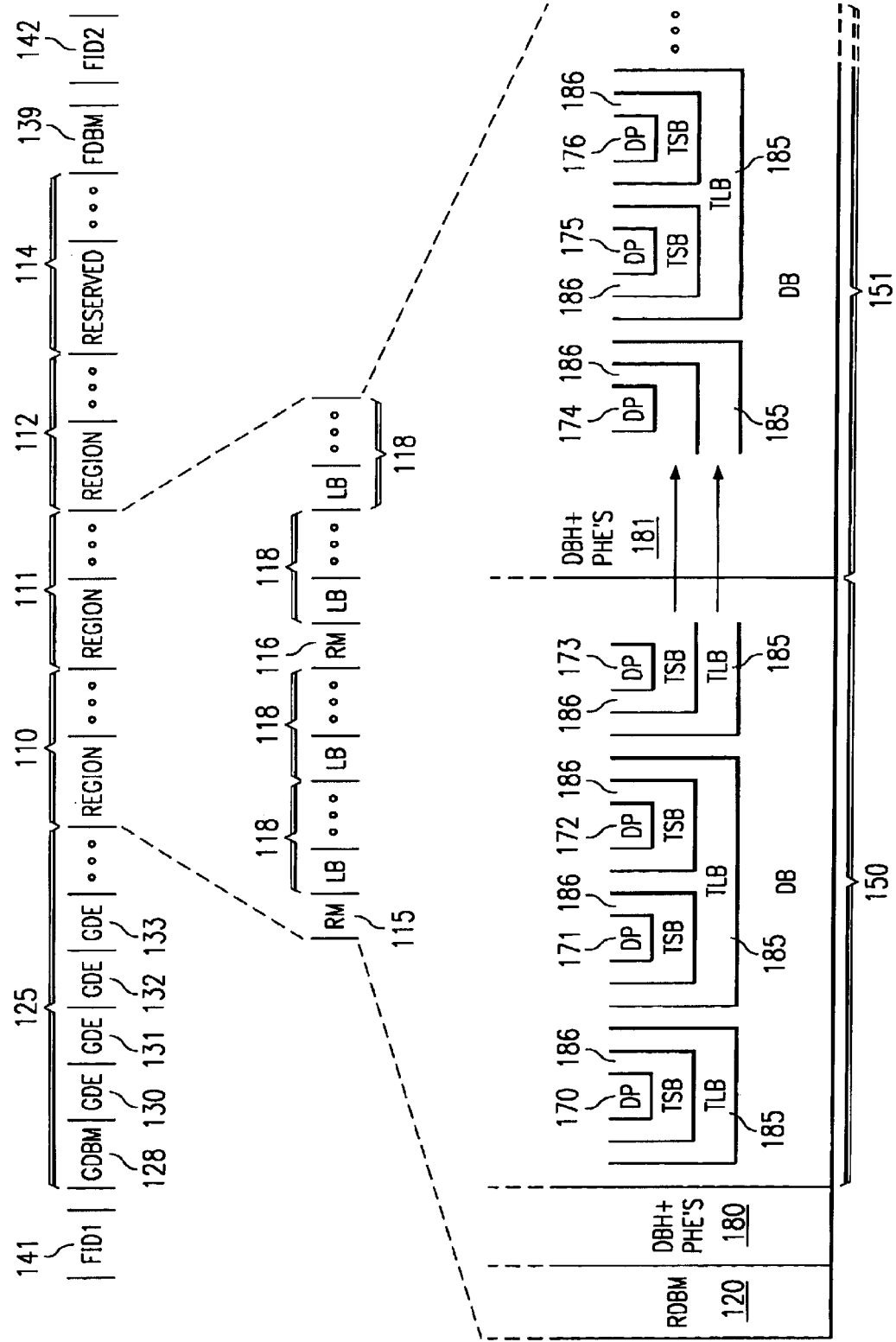
FIG. 5 is a diagrammatic representation of format constructs which identify partitions and data segments on a random access data storage medium such as that of FIGS. 2A and 2B, which is employed with the present invention.

Referring to FIG. 5, an arrangement of a format construct for storing data on a removable random access data storage medium, e.g., hard disk 25 of cartridge 26 of FIGS. 2A and 2B, in the plurality of sectors 27, is illustrated as described in the incorporated U.S. patent application Ser. No. 09/970,881.

Specifically, the data is stored and mapped into constructs of three levels. The third level comprises regions 110, 111, 112, in which each region can be a different format, or an entire random access medium may comprise a single region of one format. One type of format of interest with respect to the present invention comprises that of tape, but other formats may comprise optical of various types or disk. Magnetic tape cartridges store data in a linear sequential format and access data by unwinding the tape from one reel and winding it onto another reel. The linear sequential format may comprise a continuous stream of data, or may comprise data blocks of variable length, or other formats. Each region has an identification of the region in terms related to the specific format of the data, and is provided in a region device block map "RDBM" 115, 116 and is provided related to the sequentially numbered logical sectors 27 of FIG. 2B. The data is written in the designated format, for example, in logical blocks 118. In the case of a linear sequential format, such as a magnetic tape format which employs sequential device blocks of variable lengths, such as the IBM 3590, the identification of the format comprises the beginning points of all the device blocks of the region, and is provided in a region device block map "RDBM" 120.

A second level construct is recorded comprising a global device block map 125, with a header area "GDBM" 128 and having at least one global device block element "GDE" 130–133 for each region. Each global device block element identifies the bounds of the data recorded in the corresponding region in terms of the sequentially numbered logical sectors 27 of FIG. 2B. The GDE indicates the starting point and size of the region in terms of the logical sectors, and may comprise format specific information, e.g., for performing high speed locates or for rebuilding an RDBM. A format device block map "FDBM" 139 is provided which comprises the initial header area of the GDBM 128. The "FDBM" 139 remains unchanged during normal use and is not updated, and includes the initial portion of each GDE, identifying the starting point of each region.

A first level construct is recorded comprising at least one format identifier "FID1" 141, and preferably with a second, redundant format identifier "FID2" 142. The format identifiers each have a pointer indicating the location and size of the second level construct, the global device block map, in terms of the sequentially numbered logical sectors 27 of FIG. 2B.

Still referring to FIG. 5, in another embodiment directed specifically to data in the linear sequential format, a construct, such as the third level construct, is recorded comprising at least one region for writing and reading data in the linear sequential format, such as region 110–112. The data of the linear sequential format is organized into a stream of sequential device blocks 150–151 of variable lengths for writing and reading. Each region has a region device block map "RDBM" 120 which identifies an association between the format specific address method comprising the device blocks 150–151 and the region in terms of the sequentially numbered logical sectors 27 of FIG. 2B.

Although illustrated as comprising a true linear sequence, the data and the constructs are recorded on a random access medium, and are distributed amongst the tracks and amongst sectors 27 of FIG. 2A in any appropriate manner.

The linear sequential format data is additionally organized in a stream of data segments 170–176. In the incorporated U.S. patent application Ser. No. 09/970,881, the data segments are termed "device packets", called "DP". The data segments 170–176 are no greater in size than, and none of which span a boundary between, device blocks. Further, for each of the device packets of a device block, e.g., device block 150–151, a device packet header element "PHE" is provided in the device block header "DBH" 180–181. In the instant example, the data stream comprises tape logic blocks "TLB" 185 and tape sub-blocks "TSB" 186. The device packets are defined as no greater in size than a tape sub-block 186, and additionally do not span a boundary between device blocks. Thus, device packets 173 and 174 split a tape sub-block 186 and a tape logic block 185 so as to not span a boundary between device block 150 and device block 151, such that device packet 173 is in device block 150, and device packet 174 is in device block 151. The respective device packet header elements "PHE" are thus also provided in the respective device block headers "DBH" 180 and 181 of the respective device blocks 150 and 151. The device packet header elements each comprises an indicator of the linear sequential format data of the device packet, in terms of the linear sequential format.

As specific examples, a tape logic block 185 has one or more sub-blocks 186, and may vary in size upwards from one byte, and a sub-block 186 has one or more device packets and may vary in size from the size of a tape logic block 185 to a certain maximum value, such as 256 kb, whichever is smaller. The device packets are defined as comprising a sub-block 186 or as a portion of a sub-block to prevent spanning a device block boundary.

Alternatively, the "data segments" of the present invention may comprise tape logic blocks 185, sub-blocks 186, or device blocks 150–151, each of which comprises a portion of a region 110–112.

Also as described in the incorporated U.S. patent application Ser. No. 09/970,881, the random access medium may be arranged in sets of regions 110–112. As one example, a set of regions may be reserved for related data. Herein, a set of regions is termed a "common data stream" or a "partition".

In the incorporated U.S. patent application Ser. No. 09/970,881, the regions of a set, or a "partition", have a partition identifier, and each region of the partition is given a region sequence number. The partition identifier and the region sequence numbers are provided in the GDE 130–133 for each region as stored in the GDBM 125.

Thus, the partition identifier for a partition may be easily identified, and the location of a region in a partition may be identified by means of the region sequence number, such that the partition may be tracked and maintained.

In accordance with the present invention, referring to FIG. 6, an alternative form of maintaining partitions and associated control information is illustrated. Thus, an index 410 is provided, and may be stored on the removable random access data storage medium 25 of FIGS. 2A and 2B, and identifies the partitions 420 for each data segment 421 of the partition.

As discussed above, a data stream may not be written in a continuous sequence at one time in as much space as is required. Rather, as in tape or optical disk, each data set may have a particular initial sequential amount of storage capacity allocated to it. Thus, as data is added to the data set, it is written at an "append point" at the end of the previously written data set. Should the added data continue beyond the allocated storage length, and another stacked data set immediately follow the allocated storage length, the data is written at the next available location.

As discussed above, the constructs are not necessarily recorded in a linear fashion, and, as such, the append point may be provided at any suitable random access location of the random access medium.

Further, as data sets are read, altered and rewritten, the desire is to rewrite the data in the same space as the original data set. However, as above, the data to be rewritten may extend beyond the allocated storage capacity, and the data set is split and the additional data stored at an available location.

Referring to FIG. 6 as an example, a partition may comprise a series of segments of data having a sequence 422, for example, in which the segment sequence comprises the sequence within a region in combination with the region sequence number, above. The location address 423 comprises the random access mapped address of the first segment of a data stream, and comprises the append point of each subsequent segment in the sequence 422 of the data stream. Herein, a partition may also comprise a data stream that is provided in a single region.

In accordance with the present invention, the tape or optical disk sequential organization of the data stream is simulated by organizing the read accessed non-sequentially written data segments, e.g., device packets 170–176 of FIG. 5, for sequential access by the host. In one embodiment, (A), the data is read in the most efficient order of access, e.g., in the random access order of the data segments, and the data stored in a buffer, e.g., buffer 56 of FIG. 3, as accessed, and then is arranged, e.g., by means of pointers, in sequence in the buffer. In another embodiment, the data segments are accessed in actual linear sequence at the removable random access data storage medium 25, and stored in sequence in buffer 56.

The procedure is followed in reverse in writing data to the removable random access data storage medium 25.

Referring additionally to FIGS. 3 and 4, in an aspect of the present invention, a host system 310, 312 may select a LUN for a particular access, and a control, e.g., control 35, makes the assignment of the LUN 45–47 and therefore of the accessor 60–65. The assignment may be changed for each access, or the assignment may be for the duration of the connection to a host, etc. The control 35 responds to a read and/or write access of one of the accessors to an identified partition by, identifying at least one data segment of the partition for that access.

Upon the occurrence of a write access for one or more data segments of a partition by the write access logical accessor, e.g., accessor "H1/L0" 60 of FIG. 3, the control 35 establishes, as a write accessed context, at least one data segment of the identified partition for the write access. The control locks the write accessed context to the write access logical accessor.

The term "context" herein may comprise a single data segment, or may comprise a grouping of data segments. Specifically, as discussed above, once writing is conducted at any point in a data set that is being rewritten, the remainder of the data subsequent to the point at which the writing occurs is likely to be changed and lacks current integrity. Therefore, in one embodiment of the present invention, a write accessed context may comprise the data segments comprising the total amount of data from the present write to the end of the data set.

As discussed above, with respect to FIG. 5, the "data segments" of the present invention may comprise device packets 170–176, tape logic blocks 185, sub-blocks 186, or device blocks 150–151, each of which comprises a portion of a region 110–112.

The control then operates the read/write access unit 30 to access the write accessed context, for writing the data in the available space, e.g., as data segments 170–176.

In accordance with the present invention, as the writing is conducted in a discontinuous manner, the control provides concurrent access by concurrently allowing read access to the data of the removable random access data storage medium by logical accessors, e.g., logical accessors "H2/L0" 61 and "H1/L2" 64 units "LUN 1" 46 and "LUN 2" 47 of FIG. 3, other than the locked write access logical accessor "H1/L0" 60 of FIG. 3.

As the typical random access medium, such as a magnetic disk drive, has only one head, the concurrent access cannot be simultaneous. Rather, in the wait period between writes, the head is accessed to the read access data segment(s), and then is accessed to the next location of the discontinuous write process.

Hence, herein, the terms "concurrent" and "concurrently" are defined to comprise one access operating at the same time as, but not simultaneously with, another access.

The control 35 additionally prevents read access to the write accessed context by any logical accessor, e.g., accessors 61–65 of FIG. 3, other than the locked write access logical accessor, e.g., "H1/L0" 60; and prevents write access to any data of the partition of the removable random access data storage medium by other than the locked write access logical "H1/L0" 60.

If the access continues from the present context to another context in a sequence, the context is advanced, e.g., to the next data segment, and the lock is changed to the new context. In the embodiment of the present invention in which a write accessed context comprises the data segments comprising the total amount of data from the present write to the end of the data set, the next context may comprise the next data set in a partition.

Upon completion of the write access by the write access logical accessor, the control releases the locking of the context to the assigned write access logical accessor "H1/L0" 60 of FIG. 3.

Figure 7:
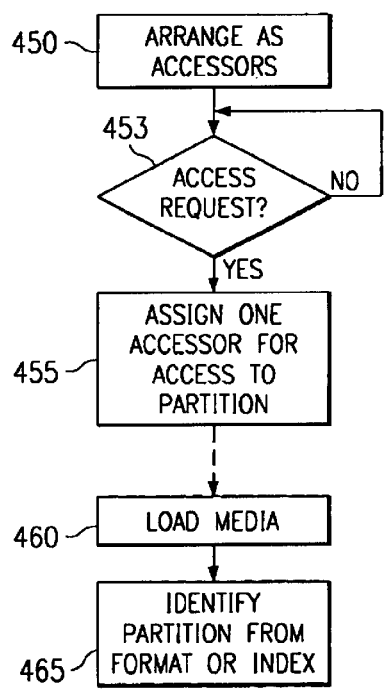
Figure 8:
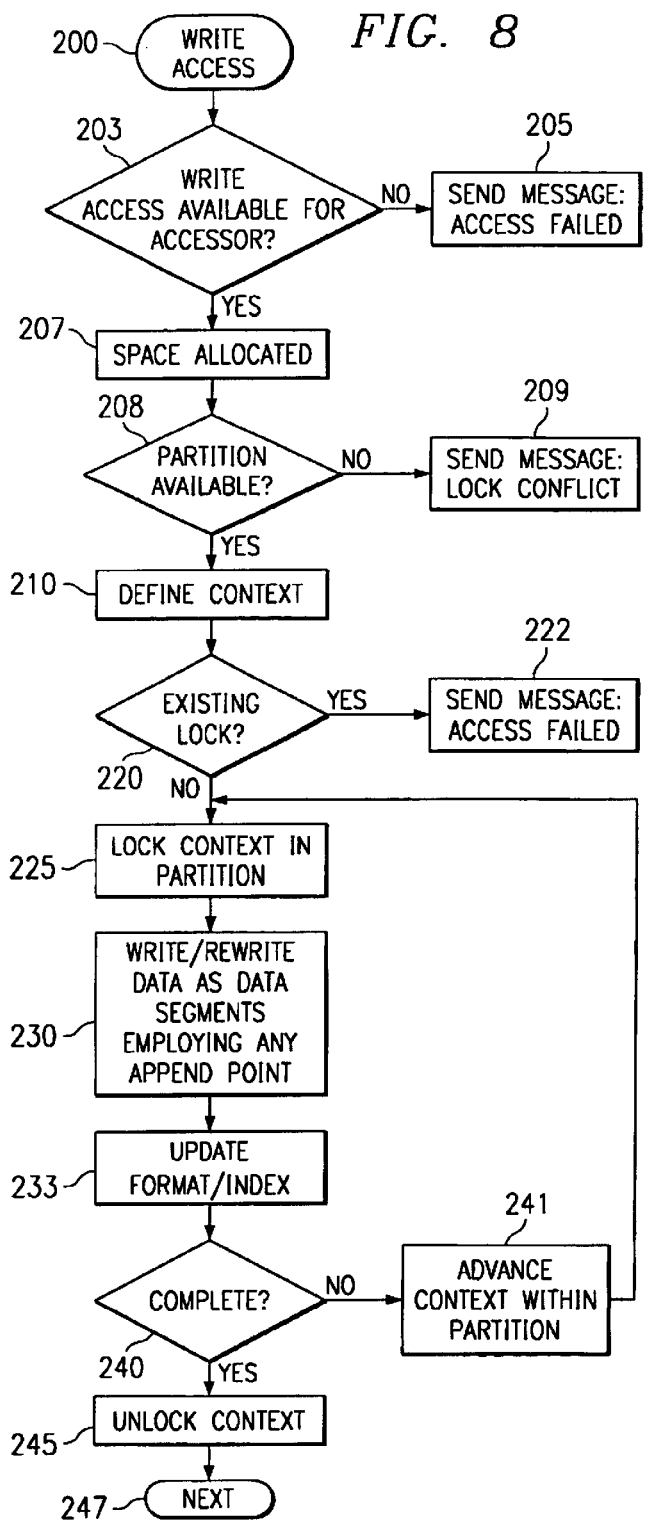

Embodiments of the method in accordance with the present invention are illustrated in FIGS. 7–9.

Referring to FIGS. 3, 4 and 7, in step 450, a plurality of logical units 45–47 are provided, with each logical unit arranged to communicate with the hosts 310, 312. The logical units, or "LUNs" in SCSI terminology, may be formed on a fixed basis in read/write control 35 of data storage drive 30, or may be formed as desired by the read/write control 35 or as the result of commands from the library control 302. The random access data storage drive 30 is provided with several virtual addresses, at least one for each logical unit 45–47, and further virtual addresses may be provided for each logical unit with respect to each host, forming the logical accessors 60–65. The library control 302 may change the virtual addresses of the logical units 45–47, logical accessors, or of the drives using the direct signal lines 328.

Steps 453 and 455 represent the typical dynamic assignment of an accessor in response to an access request, which may comprise a read and/or write access request from a host. In step 455, an accessor is assigned to the access request. In the case of an attempted write access when a read accessor is currently positioned in the proposed context which would be locked, or if another write accessor is currently holding any lock in the same partition, the write command and attempted accessor assignment are failed to the host. Alternatively, as discussed above, the assignments may be fixed or may be made on a longer term basis.

It is likely that a host will request a series of read and/or write accesses in sequence, as the host works with the data. Hence, once an accessor is assigned, the access through the assigned accessor may continue throughout the time that the host is dealing with, e.g., a partition.

Subsequently, in step 460, a selected random access data storage medium 25, 26 is provided to the data storage drive 30 by the robot 354, 356 from its storage shelf 342, and loaded by the load/unload arrangement 31. The medium 26 may be selected by a host, or may be selected by the library control 302 as a physical volume containing a logical volume selected by a host.

Referring to FIG. 5, and as discussed in the incorporated U.S. patent application Ser. No. 09/970,881, in step 465 of FIG. 7, the GDBM 125 is examined to identify the partition of the desired data. At least one GDE 130–133 provided for each region, and, for regions of a partition, the GDE comprises the partition identifier and the region sequence number of the region within the partition. Referring additionally to FIG. 6, alternatively, the index 410 is read from the medium 25 by the read/write access unit 32 in step 465 of FIG. 7 and the index is stored by the read/write control 35 of the data storage drive 30.

The host or library control will have requested read and/or write access to at least a segment of a data stream. If the request is to read a data segment or a data stream, the data is identified as a partition. A data stream to be written may be a writeover of an existing data stream, an addition to an existing data stream, or may be a new data stream. If the data stream comprises a writeover or an addition to an existing data stream, the partition is identified. If the data stream is new, a new partition is created. Thus, referring additionally to FIG. 5, step 465 comprises identifying or generating the partition for at least the data segment (e.g., device packet 170–176) of a common data stream. The index 410 of FIG. 6 or format of FIG. 5 also provides the physical location 423 of each segment and the sequence number 422 of the segment.

Referring to FIGS. 3, 4 and 8, assuming that a selected random access data storage medium 26 has been loaded in the data storage drive 30, a host 310, 312, or the library control 302, in step 200, requests write access to the loaded medium, employing an address of a logical accessor 60–65. In step 203, since only one logical accessor is allowed write access to each partition at one time, step 203 determines whether write access is available for the desired logical accessor. As an example, another logical accessor than the requesting logical accessor may be assigned write access to the same partition. If write access is not available, a message is sent in step 205 that the write access failed. The requesting agent may subsequently repeat the request at the same or a different logical accessor, change to a different partition and retry, or may inquire as to the status of the logical accessors before repeating the request.

Referring additionally to FIGS. 5 and 6, if the logical accessor has been granted write access, then, in step 207, the GDE 130–133 or the index 410 is examined by the read/write control 35 of the data storage drive 30, where it is stored either temporarily or continuously, as discussed above, to allocate the desired space. Any additional space required to fulfill the write may be reclaimed from the GDE 130–133 or the index 410, or a new GDE or index entry may be allocated as per the logical format.

If a read access is being conducted in a partition, a concurrent write access has the potential of rendering invalid some or all of the data in and subsequent to the portion of the partition being written, rendering the read invalid. Thus, step 208 determines whether a read access is positioned in the partition (optionally, in the area of the partition) to be locked. If so, a message is sent in step 209 that there is a conflict with the lock. The message may be reported to the host as an access failure similar to step 205, and the host has the same options as discussed therewith.

If the partition is available, the context of the partition (from step 465 in FIG. 7) is determined in step 210, employing the GDE 130–133 of FIG. 5 or the index 410 of FIG. 6. For example, if the context comprises a segment in the partition, the location of that segment 423 is identified. If the context comprises a group of segments, or, if as discussed above, a context comprises a segment to be written and all of the segments remaining in the data set subsequent to the data segment being written, the partition 420 of that segment is identified, and all data segments for that group or data set of the partition are then determined, together with the sequence 422 of those segments.

In step 220, since only one context may be locked at one time for each partition, should the logical accessor granted write access in steps 453 and 455 of FIG. 7 switch from one write access to another, the control, e.g., read/write control 35, determines whether there is an existing lock for the newly requested partition, meaning that another host, etc., currently has write access for that context or for a portion of the context.

Alternatively, only one context of the medium may be locked at one time, and step 220 determines whether there is any existing lock for any context of the medium.

In either case, if so, the write access is failed by the control 35 in step 222, and any retries must be managed by the host.

If no other lock is in place, the context defined in step 260 of the partition 420 is locked to the assigned write access logical accessor in step 225. Referring additionally to FIGS. 3 and 5, as an example, logical accessor 60 has been assigned write access, and is locked to a context of data segments 170–173.

In accordance with the present invention, the control concurrently allows read access to the data of the removable random access data storage medium by other logical accessors, e.g., accessors "H2/L0" 61 and "H1/L2" 64, preventing read access to any write accessed context by any logical accessor unit other than the respective locked write access logical accessor, e.g., logical accessor "H1/L0" 60, and preventing write access to any data of the respective locked partition of the removable random access data storage medium by other than the locked write access logical accessors.

The control then, in step 230, operates the read/write access unit to access the write accessed data segments of the locked contexts, for writing the data as segments, e.g., data segments 170–173 of FIG. 5, on the random access data storage medium, employing any append point. As is known to those of skill in the art, the append point are typically identified in the headers of the data and format control structures, i.e., GDBM 128 and GDE's 130–133 of FIG. 5, or table 410 of FIG. 6.

Specifically, the control identifies an append point for the next sequential segment of the identified partition, writes the appended data in the random access sequence as data segments of the identified partition, and identifies the appended data as continuing the sequence of data segments at the append point of the identified partition.

Either as the data of the context is being written, or once all of the data of the context data stream has been written, the location or status of the context is updated in step 233 to identify the written segments in the updated partition.

The data stream may be written by the read/write access unit 32 so as to simulate the tape or optical disk sequential organization by organizing the data segments in the buffer associated with the write access logical accessor, e.g., buffer 70 and logical accessor 60 of FIG. 3. In one embodiment, the data is written from the buffer to the random access data storage medium in the most efficient order of access, but the sequential organization is simulated by means of the mapping of the incorporated U.S. patent application Ser. No. 09/970,881. In another embodiment, the data segments are written from the buffer in sequence order at the removable random access data storage medium 25.

The data stream being written may replace or be added to the existing data stream, and, if added, is written at an append point at the end of the previously written data. The append point is mapped, for example, to comprise the beginning of a device block 150, 151 of FIG. 5.

Step 240 determines whether the write operation of the write access to the partition has been completed and the index updated. If not, step 241 advances the write operation to the next context within the partition, step 225 locks the next context, and steps 230 and 233 continue to write the data of the next context. Upon completion of the write access by the write access logical accessor, the control, in step 245, releases the locking of the context, e.g., segments 170–173 of FIG. 5, to the assigned write access logical accessor, e.g., "H1/L0" 60 of FIG. 3, and proceeds to the next command in step 247.

As discussed above, in accordance with the present invention, the control concurrently allows read access to the data of the removable random access data storage medium by logical accessors, e.g., logical accessors "H2/L0" 61, "H1/L1" 62, etc., of FIG. 3. Also, the control concurrently allows write access to data of the removable random access data storage medium by multiple logical accessors as per the above locking methodology.

An embodiment of the read access is illustrated in FIG. 9, beginning at step 250, where the read access is requested at one of the logical accessor, e.g., logical accessors 60–65 of FIG. 3. Referring additionally to FIGS. 3–6, in step 255, the GDBM 125 or index 410 is examined by the read/write control 35 of the data storage drive 30 to determine whether the requested context is in the medium and is valid. The request may comprise an entire partition 420, or particular data 421, and may comprise single data segment or a full data stream. If the wrong segment, etc., is requested, or if the requested data is not valid, a message is sent in step 258 that there is no valid data.

If the data, location, partition, etc., is valid, the context of the partition (from step 465 in FIG. 7) is determined in step 260, employing the GDE 130–133 or the index 410. For example, if the context comprises a segment in the partition, the location of that segment 423 is identified. If the context comprises a group of segments or a data set, the partition 420 of that segment is identified, and all data segments for that group or data set of the partition are then determined, together with the sequence 422 of those segments.

In step 263, the control, e.g., read/write control 35, determines whether there is an existing lock for that context, meaning that the logical accessor having write access, e.g., logical, accessor 60 is locked for write access to the requested context, or part of that context. If so, the read access is failed by the control in step 269 and the report made that a lock has been encountered. Any retries must be managed by the host.

In sequential format implementations, it is not possible to traverse into, or to be logically positioned within, a currently locked context, since sequential reads or explicit repositions are failed to the host. Hence, an encounter with a lock may be reported in step 269 as a specialized "end of data response".

If no lock is in place for the requested context, the partition is read in step 275 by the read/write access unit 32. In accordance with the present invention, the tape or optical disk sequential organization of the data stream is simulated in step 277 by organizing the random accessed data into the desired sequence, for sequential access by the host. In read accessing the data segments of an identified partition, the control additionally identifies any write appended data as the identified partition.

Thus, in step 275, the data segments of the context may be read, (A), in the most efficient order of random access of the random access medium, and the data stored in a buffer, e.g., buffer 56, as accessed, and then, in step 277, is arranged, e.g., by means of pointers, in sequence in the buffer.

The sequence of data segments in the data stream is determined by the sequence number 422 of the GDE 130–133 of FIG. 5 or of the index 410 of FIG. 6. The location of the first data segment of the common data stream, and the location of the append point for each of the subsequent segments is provided by the GDE or by the location address 423 of the index 410.

In another embodiment, (B), the data segments are accessed in the tape or optical disk sequence at the removable random access data storage medium 25, e.g., by employing the mapping of the U.S. patent application Ser. No. 09/970,881, and stored in sequence in buffer 56.

Once organized, the control provides read access to the read access logical accessor for the requesting host system 310, 312 or library control 302 in step 280. Step 285 determines whether the entire data stream of the request has been read. If not, step 286 advances the read operation to the next context within the partition, step 263 determines whether the next context is locked, and steps 275, 277 and 280 continue to read the data of the partition. Upon completion of the read access by the read access logical accessor, the control, in step 287, receives the next command, e.g., from a host.

Thus, the present invention provides concurrent read and write access to simulated sequential data stored on a random access medium, locking one or more write accessed contexts, which are comprised of at least a data segment of an uniquely identified partition, to a write access logical accessor, and a read/write access unit accesses the write accessed context for the locked write access logical accessor.

As the read or write media access is conducted in a discontinuous manner, concurrent read and write access is provided to the data of the removable random access data storage medium by multiple logical accessors other than the locked write access logical accessor, preventing read access to any write accessed contexts by any logical accessor other than the respective locked write access logical accessor; and preventing write access to any data which is in a partition which has a write accessed context by another logical accessor.

Thus, the present invention takes advantage of the wait periods during the discontinuous read and write processes to utilize the high speed random access of the random access medium to provide concurrent access to different data sets, and provides simulated tape or optical disk sequential access by at least one host to the data of the removable random access data storage medium.

Those of skill in the art understand that alternative mapping arrangements may be employed, and that alternative arrangements of the LUNs and of the random access data storage media may also be employed.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage drive for providing concurrent read and write access by at least one host to data storable on a removable random access data storage medium; said data comprising a plurality of data segments, at least some of said data segments comprising at least one partition; said removable random access data storage medium accessible at and removable from said data storage drive; comprising:

a plurality of logical accessors, each said logical accessor arranged to communicate with said at least one host for read and/or write access to said removable random access data storage medium;

a read/write access unit providing read and write access to said removable random access data storage medium; and a read/write control coupled to said plurality of logical accessors and to said read/write access unit, said read/write control:

responds to said read and/or write access of one of said logical accessors to one of said partitions, identifying at least one said data segment as comprising said partition for said access;

upon occurrence of a write access for at least a data segment of said identified partition by one of said logical accessors, establishes, as a write accessed context, at least said one data segment of said identified partition for said write access, locking said write accessed context to said one of said logical accessors for said write access;

operates said read/write access unit to access said write accessed context for said locked write access one of said logical accessors;

concurrently operates said read/write access unit to provide read and/or write access to said data of said removable random access data storage medium by other said logical accessors than said locked write access one of said logical accessors; preventing read access to said write accessed context by any logical accessor other than said locked write access one of said logical accessors; and preventing write access to any data of said locked write access partition of said removable random access data storage medium by other than said locked write access one of said logical accessors; and upon completion of said write access by said locked write access one of said logical accessors, releases said locking of said write accessed context to said locked write access one of said logical accessors.

2. The data storage drive of claim 1, wherein said read/write control, additionally, upon occurrence of a read access by one of said logical accessors, determines whether said read access is to a data segment other than said data for which access is prevented, and, if so, establishes, as a read context, at least one data segment of an identified partition for said access.

3. The data storage drive of claim 1, wherein said read/write control unit, in identifying said partition, additionally organizes said data segments of said partition in sequence for sequential access by said at least one host; and, in preventing said read access to said write access context, additionally prevents read access to any data segments subsequent in said sequence to said write context.

4. The data storage drive of claim 3, wherein said read/write control unit, in read accessing and organizing said data segments, accesses said data segments in sequence at said removable random access data storage medium.

5. The data storage drive of claim 3, additionally comprising a buffer for storing data segments, said buffer coupled to said read/write control unit and to said logical accessors, and wherein said read/write control unit, in read accessing and organizing said data segments comprises organizing said data segments in sequence in said buffer.

6. The data storage drive of claim 1, additionally comprising a buffer for storing data segments, said buffer coupled to said read/write control unit and to said logical accessors, and wherein said read/write control unit, in accessing said write accessed data segments, additionally:

writes said write accessed data to said buffer;

writes said write accessed data from said buffer to said removable random access data storage medium in a random access sequence; and identifies said write accessed data segments as comprising said identified partition.

7. The data storage drive of claim 1, wherein said read/write control unit additionally maintains an index for each of said partitions, said index indicating the physical location and sequence of said data segments thereof for said removable random access data storage medium.

8. The data storage drive of claim 1, wherein said read/write control unit, in write accessing said data segments of an identified partition, additionally:

identifies an append point for the next sequential segment of said data segments of said identified partition;

writes appended data to said removable random access data storage medium in a random access sequence, as data segments of said identified partition; and identifies said appended data as continuing said sequence of said data segments at said append point of said identified partition.

9. The data storage drive of claim 8, wherein said read/write control unit, in read accessing said data segments of an identified partition, additionally identifies any write appended data as said identified partition.

10. The data storage drive of claim 1, wherein said identified partition comprises a sequential data set of random access data segments, and wherein said random access data storage medium may comprise additional partitions having similar and/or alternatively arranged data sets; and wherein said read/write control unit additionally comprises an index identifying said sequentially arranged partition as such.

11. The data storage drive of claim 1, wherein said data storage drive is coupled to a plurality of said hosts, wherein separate ones of hosts are associated with separate ones of said logical accessors for write access, and wherein said read/write control unit additionally assigns said write access to one of said plurality of logical accessors, said assignment based upon the one of said logical accessors associated with said host comprising the source of said write access, said assignment made only when said identified partition is not currently accessed by another logical accessor.

12. An automated data storage library for storing and retrieving tape media and removable random access data storage media, at least one of said removable random access data storage media storing data comprising a plurality of data segments, at least some of said data segments comprising at least one partition; said library comprising:
  a plurality of storage shelves for storing said tape media and for storing said removable random access data storage media;
  at least one data storage drive for providing concurrent read and write access by at least one host to data stored on said at least one removable random access data storage medium storing data comprising a plurality of data segments;
  at least one robot for storing and retrieving said tape media and for storing and retrieving said removable random access data storage media at said storage shelves, and for loading and removing said removable random access data storage media to and from said data storage drive;
  a library control coupled to said robot and to said data storage drive, for operating said robot to store and retrieve said tape media at said storage shelves, to store and retrieve said removable random access data storage media at said storage shelves, and to load and remove said removable random access data storage media to and from said data storage drive;
  a plurality of logical accessors associated with said data storage drive, each said logical accessor arranged to communicate with said at least one host for read and/or write access to said removable random access data storage medium;
  a read/write access unit providing read and write access at said data storage drive to said removable random access data storage medium; and
  a read/write control for said data storage drive coupled to said plurality of logical accessors and to said read/write access unit, said read/write control:
    responds to said read and/or write access of one of said logical accessors to one of said partitions of one of said removable random access data storage media storing data comprising a plurality of data segments loaded at said data storage drive, identifying at least one said data segment as comprising said partition for said access;
    upon occurrence of a write access for at least a data segment of said identified partition by one of said logical accessors, establishes, as a write accessed context, at least said one data segment of said identified partition for said write access, locking said write accessed context to said one of said logical accessors;
    operates said read/write access unit to access said write accessed context for said locked write access one of said logical accessors;
    concurrently operates said read/write access unit to provide read and/or write access to said data of said removable random access data storage medium by other said logical accessors than said locked write access one of said logical accessors; preventing read access to said write accessed context by any logical accessor other than said locked write access one of said logical accessors; and preventing write access to any data of said locked write access partition of said removable random access data storage medium by other than said locked write access one of said logical accessors; and
    upon completion of said write access by said locked write access one of said logical accessors, releases said locking of said write accessed context to said locked write access one of said logical accessors.

13. The automated data storage library of claim 12, wherein said read/write control associated with said data storage drive, additionally, upon occurrence of a read access by one of said logical accessors, determines whether said read access is to a data segment other than said data for which access is prevented, and, if so, establishes, as a read context, at least one data segment of said identified partition for said access.

14. The automated data storage library of claim 12, wherein said library control and said data storage drive are coupled to a plurality of said hosts, wherein separate ones of hosts are associated with separate ones of said logical accessors for write access, and wherein said library control additionally assigns said write access to one of said plurality of logical accessors, said assignment based upon the one of said logical accessors associated with said host comprising the source of said write access, said assignment made only when said identified partition is not currently accessed by another logical accessor.

15. A method for providing concurrent read and write access by at least one host to data storable on a removable random access data storage medium; said data comprising a plurality of data segments, at least some of said data segments comprising at least one partition; said removable random access data storage medium accessible at and removable from a data storage drive; said method comprising the steps of:
  arranging said data storage drive as a plurality of logical accessors, each said logical accessor arranged to communicate with said at least one host for read and/of write access to said removable random access data storage medium;
  in response to a read and/or write access of one of said logical accessors to one of said partitions, identifying at least one said data segment as comprising said partition for said access;
  upon occurrence of a write access for at least a data segment of said identified partition by one of said logical accessors, establishing, as a write accessed context, at least said one data segment of said identified partition for said write access, locking said write accessed context to said one of said logical accessors;

accessing said write accessed context for said locked write access one of said logical accessors;

concurrently allowing read and/or write access to said data of said removable random access data storage medium by other said logical accessors than said locked write access one of said logical accessors; preventing read access to said write accessed context by any logical accessors other than said locked write access one of said logical accessors; and preventing write access to any data of said locked write access partition of said removable random access data storage medium by other than said locked write access one of said logical accessors; and upon completion of said write access by said locked write access one of said logical accessors, releasing said locking of said write accessed context to said locked write access one of said logical accessors.

16. The method of claim 15, wherein said step of concurrently allowing read access, additionally comprises, upon occurrence of a read access by one of said logical accessors, determining whether said read access is to a data segment other than said data for which access is prevented, and, if so, establishing, as a read context, at least one data segment of an identified partition for said access.

17. The method of claim 15, wherein said step of identifying said partition additionally comprises organizing said data segments of said partition in sequence for sequential access by said at least one host, and, in said step of concurrently allowing read access, preventing said read access to said write access context, additionally prevents read access to any data segments subsequent in said sequence to said write context.

18. The method of claim 17, wherein said step of read accessing and organizing said data segments comprises accessing said data segments in sequence at said removable random access data storage medium.

19. The method of claim 17, wherein said step of read accessing and organizing said data segments comprises organizing said data segments in sequence in a buffer.

20. The method of claim 15, wherein said step of accessing said write accessed data segments comprises the steps of:

writing said write accessed data to a buffer;

writing said write accessed data from said buffer to said removable random access data storage medium in a random access sequence; and identifying said write accessed data segments as comprising said identified partition.

21. The method of claim 15, additionally comprising the step of maintaining an index for each of said partitions, said index indicating the physical location and sequence of said data segments thereof for said removable random access data storage medium.

22. The method of claim 15, wherein said step of write accessing said data segments of an identified partition additionally comprises the steps of:

identifying an append point for the next sequential segment of said data segments of said identified partition;

writing appended data to said removable random access data storage medium in a random access sequence, data segments of said identified partition;

identifying said appended data as continuing said sequence of said data segments at said append point of said identified partition.

23. The method of claim 22, wherein said step of read accessing said data segments an identified partition, additionally comprises identifying any write appended data as said identified partition.

24. The method of claim 15, wherein said identified partition comprises a sequential data set of random access data segments, and wherein said random access data storage medium may comprise additional partitions having similar and/or alternatively arranged data sets; said method additionally comprising the step of maintaining an index for each of said partitions, said index identifying said sequentially arranged partition as such.

25. The method of claim 15, wherein said data storage drive is coupled to a plurality of said hosts, wherein separate ones of hosts are associated with separate ones of said logical accessors for write access; and wherein said method additionally comprises the step of assigning one of said logical accessors write access based upon the one of said logical accessors associated with said host comprising the source of said write access, said assignment made only when said identified partition is not currently accessed by another logical accessor.

* * * * *